United States Patent [19]
Tobey et al.

[11] 3,782,271
[45] Jan. 1, 1974

[54] AUTOMATIC PIE APPARATUS
[75] Inventors: Hubert E. Tobey, Milltown; John W. Hood, East Brunswick; Dee L. Irvin, Moonachie, all of N.J.
[73] Assignee: International Telephone and Telegraph Corporation, Nutley, N.J.
[22] Filed: Apr. 27, 1972
[21] Appl. No.: 248,319

[52] U.S. Cl.............. 99/450.6, 425/298, 425/121, 425/127
[51] Int. Cl....... A21c 9/06, A21c 9/08, A21c 11/00
[58] Field of Search................... 99/353, 354, 450.2, 99/450.3, 450.6, 430; 425/298, 112, 121, 122, 127, 129

[56] References Cited
UNITED STATES PATENTS
2,855,867   10/1958   Zeitlin............................... 99/450.6
3,394,646   7/1968   Cunningham et al........... 425/298 X
3,095,832   7/1963   Evans.................................. 99/450.6
3,112,713   12/1963   Jahn.................................... 99/450.6

Primary Examiner—Edward L. Roberts
Assistant Examiner—Alan I. Cantor
Attorney—C. Cornell Remsen et al.

[57] ABSTRACT

An automatic pie forming apparatus for individual fruit pies which are produced in a continuous in-line system. The apparatus includes an arrangement for providing a continuous strip of dough to a number of individual pie molds moving in a continuous loop. The strip of dough is fed into the molds to be filled, formed, trimmed, and a pie is dispensed automatically and positioned to be delivered to the cooking facility. The apparatus automatically provides the forming, trimming, and dispensing of the individual filled pies.

11 Claims, 6 Drawing Figures

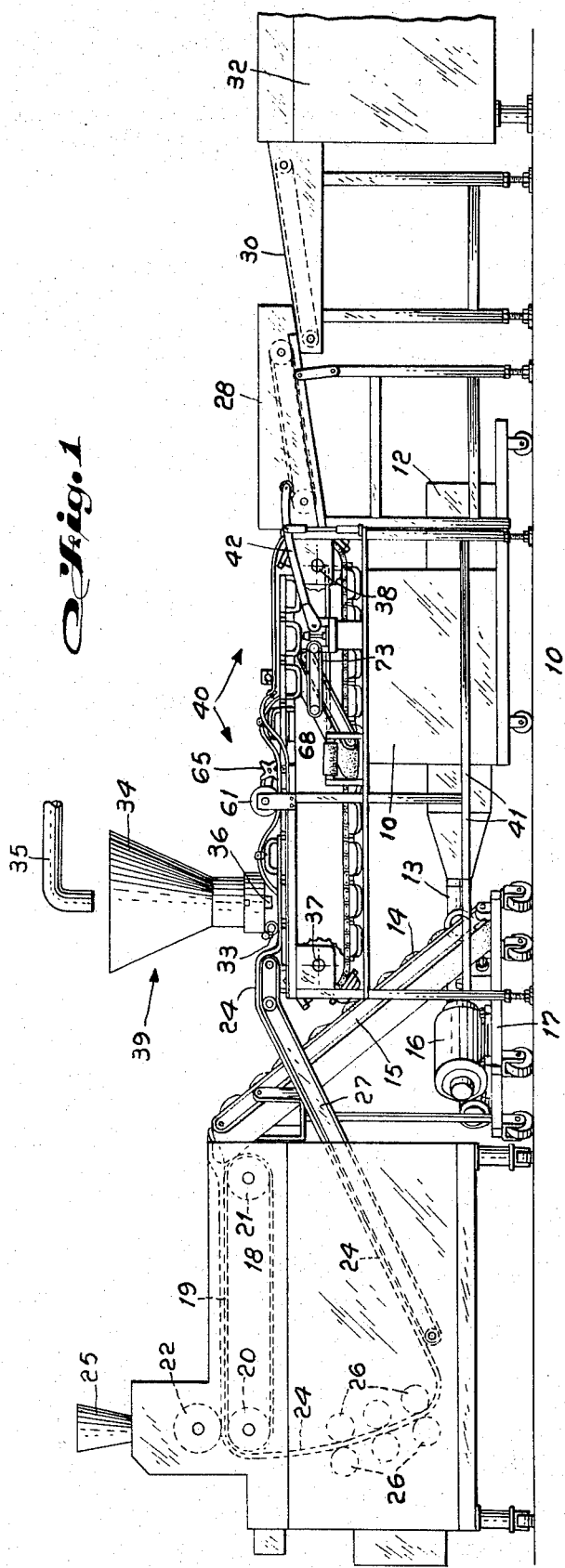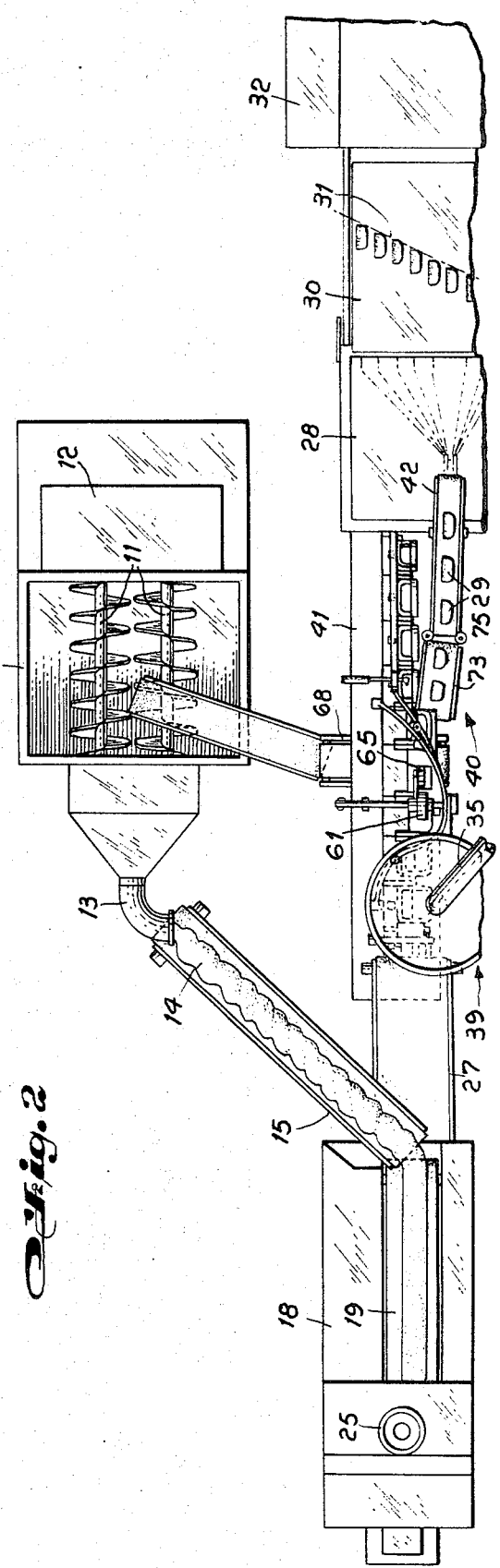

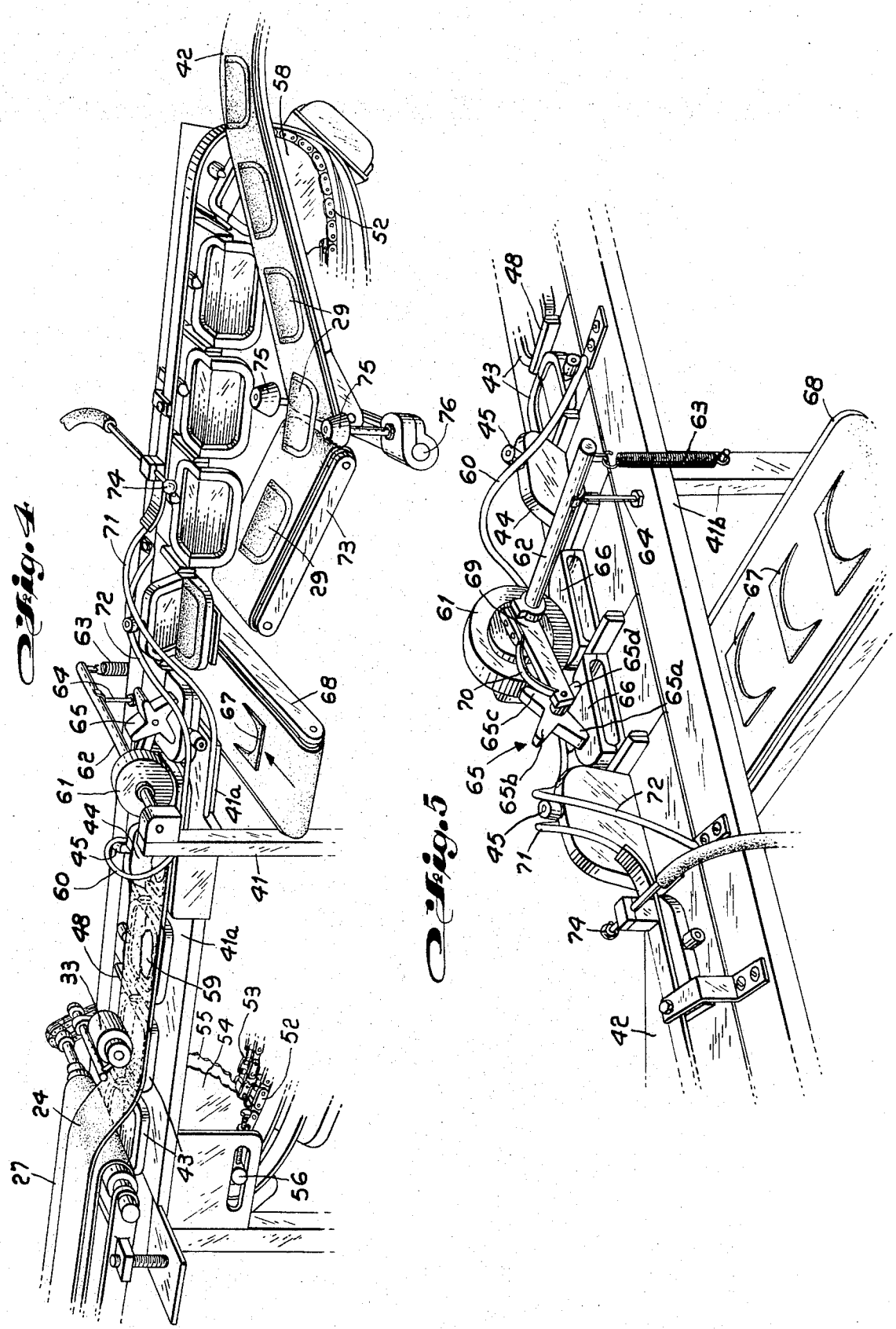

AUTOMATIC PIE APPARATUS

CROSS REFERENCE TO RELATED APPLICATION

This application is related to the application of H. E. Tobey et al. Ser. No. 248,570, filed Apr. 28, 1972. The assignee of this cross referenced application is the same as the instant application.

BACKGROUND OF THE INVENTION

In general, this invention relates to automatic pie apparatus, and more particularly to apparatus for automatically producing individual type fruit pies.

The equipment to which the apparatus relates is generally in the field of small fruit pies which are made by in-line automatic equipment and fed to a fryer or other type cooking arrangement. The systems available according to the prior art require a number of personnel to assist in the feeding of the dough, in the trimming, and removal of the pie from the molds, and in reclaiming of the excess dough. Further, the previous reclaiming methods were such that the removed portion could not be readily used again without further kneading which produced additional waste.

Another requirement is that the equipment must reach speeds wherein the pies can be produced at a rate of approximately 80 or more per minute with trouble-free operation. A minimal of operator assistance to keep the line in continual operation is desired, since the product which has become known as the individual fried pie having an iced coating and fruit filling could not be economically accomplished at a price which would be acceptable to the consuming public.

The apparatus desired, therefore, is an automatic pie molding arrangement which overcomes the deficiencies of the prior systems and may be operated in an efficient, continuous manner with minimal attending personnel.

SUMMARY OF THE INVENTION

An object of this invention is to produce an automatic pie apparatus for use in an in-line system.

Another object of this invention is to produce a pie molding arrangement which produces individual filled pie products in a continuous manner.

A still further object of the invention is to provide a continuous system for producing individual pies by an automatic arrangement that requires minimal operator assistance and whereby waste from the molded product is, for all practical purposes, eliminated.

According to the broader aspects of the invention there is provided automatic pie apparatus including means for continuously supplying a strip of dough, means for molding the dough into individual filled fruit pie products, and means in the apparatus to assist in removing the products from the mold and for delivering them to a cooking arrangement.

According to features of the invention there is provided a unique cutting arrangement, pie mold configuration, cam track control means for the pie mold, dough trimming arrangement, dough reclaim means, and pie mold removal means cooperatively coupled to insure trouble-free operation and removal of the product from the equipment.

BRIEF DESCRIPTION OF THE DRAWINGS

The foregoing objects and features of the invention will be more readily understood if reference is made to the description of a preferred embodiment in connection with the following drawings, in which:

FIGS. 1 and 2 show the automatic pie apparatus positioned in a continuous in-line system according to the invention;

FIG. 4 illustrates in greater detail the pie molding means for producing the individual pie products; and FIG. 5 illustrates in greater detail a rearward view of a portion of the pie molding line illustrated in FIG. 4.

DESCRIPTION OF THE PREFERRED EMBODIMENT

Figure 3A:
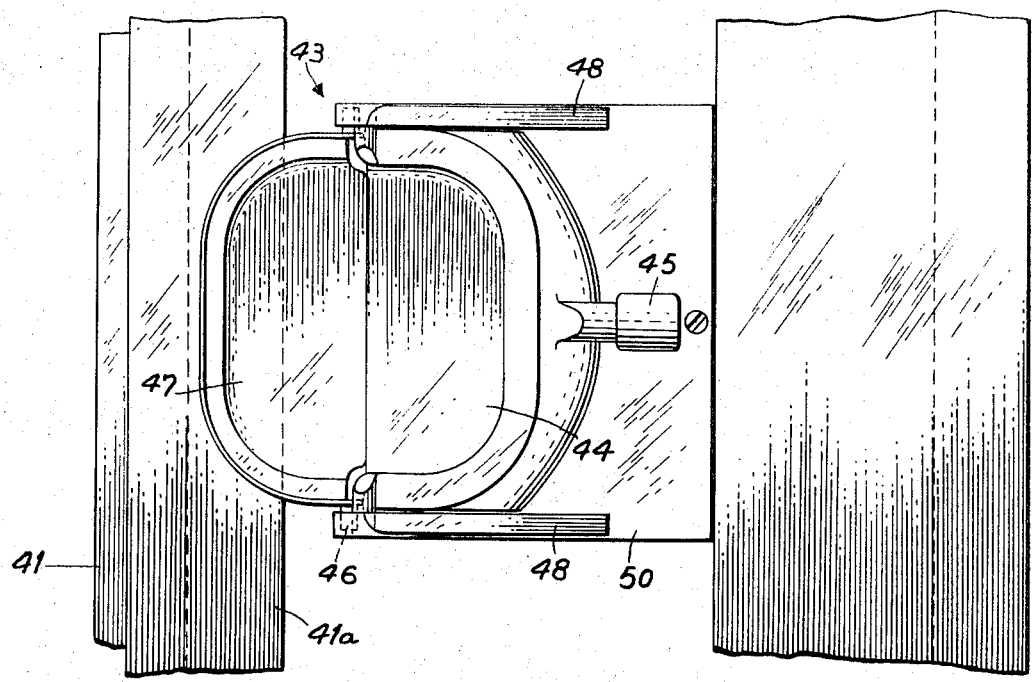
FIGS. 3a and 3b illustrate the individual pie molds and the means for moving them in the system.

Referring now to FIGS. 1 and 2 the overall automatic pie apparatus according to the invention will be described. It should be understood that certain driving chains and the particular motor drive arrangements which control the various pulleys and conveying belts are not all illustrated for purposes of clarity in the drawings, otherwise the drawings would become too cluttered with lines and chain drives and prevent easy understanding of the inventive features of the apparatus. A particular means for driving individual ones of the belts and pulleys are believed known in the art, and further illustration or discussion of the particular means desired to implement the drive of the feeds or drive sprockets will not be described, unless it is felt that they provide additional uniqueness or follow in the general description of the apparatus itself.

A dough auger feed system 10 is shown having a pair of augers 11 driven by a motor drive system 12 for feeding dough through the nozzle 13 in a continuous manner. The augers 11 feed dough which has been suitably kneaded and is in a proper condition for molding and cooking. The dough 14 is moved up the dough feed ramp 15 which may be driven by motor 16, and mounted on a movable platform 17 which also supports the dough feed ramp 15. The support platform 17 and motor 16 are not illustrated in FIG. 2 for the sake of clarity.

The dough 14 is fed into a dough shaping apparatus 18. The apparatus includes a belt 19 mounted about a pair of pulleys 20,21 either of which may be driven. The dough is shaped between pulleys 20 and 22 to begin its formation into a dough strip 24. A flour duster 25 is positioned atop pulley 20 to permit flour to be placed into the dough shaping apparatus to prevent sticking of the dough on the pulleys utilized in shaping of the dough into a continuous strip. A plurality of pulleys 25,26 cooperate to further form the strip dough 24, which dough is then carried along by the pie molding input conveyor 27. The continuous dough strip is carried by the conveyor 27 to the pie molding means 40. The detailed description of the means 40 will be more specifically described in connection with the FIGS. 3–5, and all its elements will not be numbered in connection with FIG. 1 to simplify the understanding of the overall system. The pie molding means 40 is mounted by an adjustable floor mount frame 41 and positioned so that its output conveyor 42 feeds a channeling conveyor 28, which is of the type as disclosed in the cross referenced application. The channeling conveyor 28 feeds the individually formed pies 29 to the in-feed conveyor 30 in a uniform oblique line 31 which is coupled to the cooking arrangement or fryer 32.

The dough 24 is passed in a continuous strip over the individual molds of molding means 40. The molds are driven in a continuous loop about axis 37,38 in the frame 41. A fruit filler assembly 39 is positioned to the right of a dough cutting roller 33. The fruit filler assembly 39 includes a fruit dispensing pipe 35 which is connected to a fruit supply and pump. The supplied fruit is pumped to the trough 34 for filling of the individual pies to be formed in the molding apparatus. A nozzle 36 of the filler assembly 39 dispenses in each pie mold passing thereunder a controlled amount of fruit. The filler assembly 39 with a control fruit dispensing nozzle are standard and well known in the art. Further discussion in connection with dispensing of the fruit into the individual pie molds will not be undertaken in the specification.

Figure 3B:
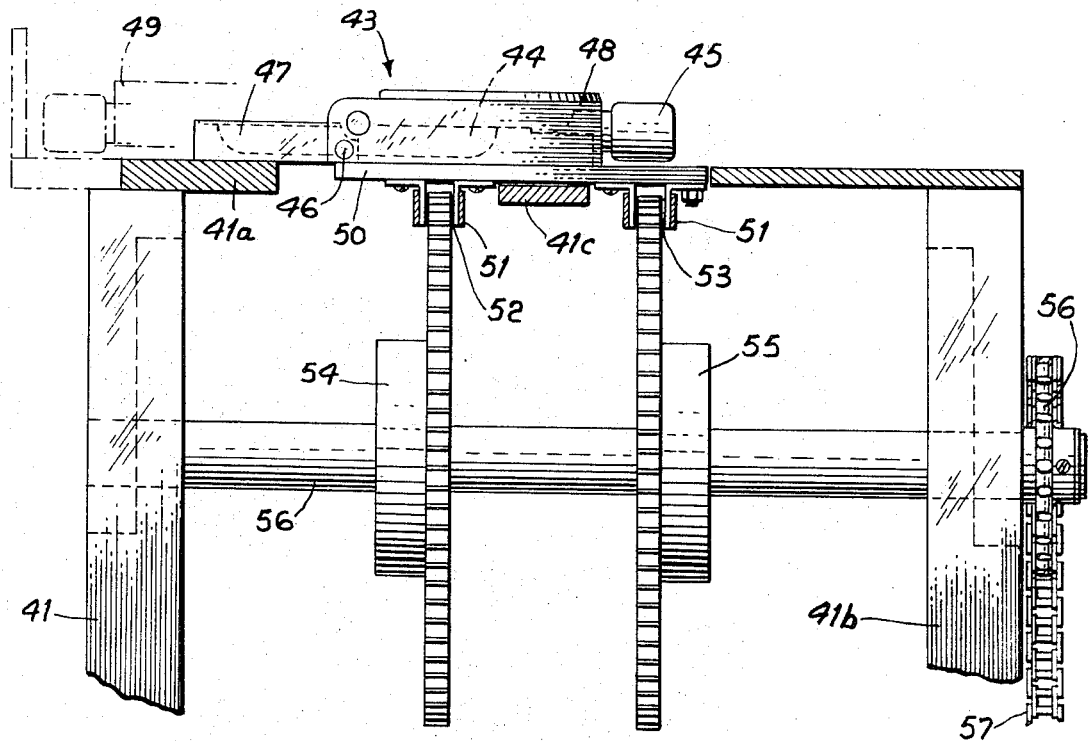

Referring now to FIGS. 3a and 3b a detail of the pie mold and driving arrangement according to the preferred embodiment is illustrated. Each individual pie mold 43 comprises a movable top portion 44 having a knob 45 which is surrounded by a plastic sleeve for riding on the cam tracks to be discussed hereinafter. The top portion of the mold is pivotally connected by pin 46 to the bottom portion 47 of the mold. The top portion 44 of the mold also contains both left and right hand hinge bar knives 48. When the top portion 44 is closed, by the knob 45 riding on the cam surface, it closes to the position illustrated in dashed lines 49. The retaining plate 41a of frame support 41 retains the bottom portion 47 in the position illustrated until the proper location in the apparatus 40 is reached, wherein the bottom portion 47 is allowed to drop in order to dispense the formed product.

The frame 41 also includes a rear portion 41b and a center support plate 41c which supports the individual mold mounting plates 50. The plate 50 contains a pair of chain mounts 51 for mounting the drive chains 52,53. The drive chains 52,53 are driven by sprocket wheels 54,55 mounted about shaft 56 in frame 41,41b. This shape is at either axis 37 or 38 of FIG. 1. The continuous loop drive is provided by a drive sprocket 56 coupled by means 57 to a motor drive means not shown. This powers the continuous loop pie molding arrangement by virtue of the connection through shaft 56 and the drive sprockets 54,55 engaging drive chains 52,53 which in turn are coupled to each of the pie molds 43 to move them in the direction illustrated in FIG. 1.

Referring now to FIGS. 4 and 5, the pie molding means is illustrated in an enlarged manner to detail the major elements of the system in a front and partial rear view. The input conveyor 27 feeds the continuous strip of dough 24 into the arrangement. The series of pie molds 43 are mounted on the chain drives 52,53, and chain 52 driven in a continuous loop by means of drive sprocket wheels 54,58. The frame 41 including the front retaining plate portion 41a support the molds 43. The molds are moved in a continuous loop and the dough 24 is laid across the mold such that the rotatably mounted cutting roller 33 cuts the dough 24 along the knife edge 48 so that the dough may be folded over in sandwich fashion. A fruit filling 59 is placed on the dough at the point indicated in FIG. 1 and before the cam close track 60 causes the upper portion 44 of mold 43 to close. The closing cam acts on the mold knob 45 to cause it to follow the contour of the cam, and by virtue of the pressure exerted by pressure roller 61 to completely seal the edge of the thereby formed filled pie.

The pressure roller 61 is mounted to the frame 41 on a shaft 62, and pressure is applied to the roller 61 by spring 63 which is fixed to the rear support 41b of the frame and biased to press the individual mold tops down ward to cause a serrated seal of the dough by edges of the mold being forced together. Support 64 is positioned to limit the lateral movement of shaft 62. A dough trim assembly including an X-shaped trimmer 65 is positioned to slide along the top surface 66 of the molds. Each of the four X-shaped surfaces 65a,b,c,d step sequentially into the spaces between the mold patterns defined by the knife edges 48 to cause the drop off of the excess dough 67 trimmed from the mold edges.

The excess dough 67 is caught by the reclaim conveyor 68 to carry the dough back to the auger feed system 10, thereby eliminating waste of the trimmings 67. A space is provided between front retaining plate 41a and 41e to permit the dropping of the excess dough forced from around the sides of the mold onto the conveyor by the trimmer 65. The trimming assembly further includes a pivotally mounted bar 69 which is pivotally mounted to shaft 62 and spring loaded by leaf spring 70 to force the trimmer in the downward direction. Since the trimmer is fabricated of a nylon or other plastic member, the legs 65a,d, as shown, slide across the top 66 of the mold and the leg 65d drops onto knife edge space and forces the excess dough down, then the trimmer pivots about leg 65d and rotates so that legs 65d and 65c ride onto the following mold. This repeats continuously with the trimmer rotating clockwise when viewed in FIG. 5, the molds moving toward the left side of FIG. 5.

After the mold has been trimmed, the cam track 71 is engaged by the mold knob 45 and the mold top portion opens. The dropping off of the top of the mold is supported by drop off support cam 72 which prevents a hard slam down of the mold. After the mold leaves the front retaining plate portion 41e, the bottom portion 47 drops to release the individually formed pies 29 which are caught by pie drop conveyor 73. It should be pointed out that the pie dough in this form cannot be easily dropped from the mold since the dough is essentially tacky in this state, a means to assist the release of the dough from the mold is required. The means provided is an air nozzle 74 which is coupled to an air pressure source not shown. The air nozzle 74 is positioned to direct a stream of air along the dropped edge of the mold to assist the dropping of the formed pies 29 from the mold onto the pie drop conveyor 73. The conveyor 73 is coupled to deliver the pies 29 to the output conveyor 42. Between conveyor 73 and 42 is a pair of conical rollers 75 rotatably mounted on shaft 76 to insure the center positioning of the pies 29 moving from the conveyor 73 to the output conveyor 42.

In summary, FIGS. 4 and 5 illustrate the pie molding means portion according to the invention. The individual molds 43 are moved in a continuous loop about the sprocket wheels which are mounted to the frame 41. A continuous strip of dough 24 is placed on the molds and the cutting roller 43 slits the dough along knife edges 48 of the mold. A measured quantity of fruit filler is placd on the mold and the top portion of the mold is closed to form the pie 29. The top mold portion 44 is closed by means of camming surface 60, and the edges of the mold are squeezed together by means of a pressure roller 61. The excess dough 67 is forced from the edges of the mold by means of a trimmer 65 which slides along the closed top of the mold and sequentially positions each of its legs into the spaces between the molds to cause the dropping of the excess dough onto a reclaiming conveyor 68. The excess dough is returned to the original feed system 10. A cam opening track 72 then causes the opening of the top of the mold to return the mold into its open condition and a support cam 72 catches the top of the mold so that it opens in a gradual manner. After the bottom portion of the mold 47 passes the front retaining plate 41e it drops to permit, in conjunction with the air supplied by a directed air nozzle 74, the dropping of the formed and filled pie product 29 onto the catch conveyor 73. This conveyor then is connected to the output conveyor to deliver the pies to the channeling conveyor, the in-feed conveyor and finally to the cooker.

As described in the foregoing specification and as illustrated in the drawings, there is provided an automatic pie apparatus in which a continuous strip of dough is fed to a molding means which causes individual pie products to be formed and dispensed, and the dispensed products are then removed for delivery to the cooker and final processing. The described system provides in an economical and with minimal human assistance, a continuous system which enables production of filled pie products on the order of 80 pieces per minute in a continuous in-line system.

While we have described above the principles of our invention in connection with specific apparatus, it is to be clearly understood that this description is made only by way of example and not as a limitation to the scope of our invention as set forth in the objects thereof and in the accompanying claims.

We claim:

1. Automatic pie apparatus comprising the combination of:
   means to produce a continuous strip of dough;
   a plurality of molding means having two parts positioned to receive said dough and to enable depositing of a pie filling therein;
   first cam means to cause one part of each of said mold means to enclose said filling and form an individual filled pie product, and said one part of each of said mold means is pivotally connected to said other part, and said one part includes knife edge sides to facilitate the cutting and subsequent folding of said dough;
   means positioned to trim the excess dough from said closed mold, and pie catching means positioned below said other part to catch the pie product when the dropping of said other part occurs;
   means to catch the excess dough and return it directly to said means producing said continuous strip of dough;
   second cam means positioned to open said one part, and third cam means to assist said one part to return to its initial condition;
   means positioned to permit the dropping of another part of each of said molds and enable removal of said individual filling pie product, and means to assist the removal of said product from each of said molding means; and
   means for feeding said product to a cooking means.

2. In automatic pie equipment having means for providing a continuous strip of dough, apparatus comprising:
   a plurality of pie molds driven in a continuous loop and positioned to receive said dough, each mold comprising displaceable top and bottom portions;
   first cam means for closing said top portion after a filling has been deposited to form a pie between said top and bottom portions;
   pressure roller means for exerting a predetermined pressure on said closed mold;
   a dough trimming assembly coupled to said pressure roller for removing the excess dough from the edge of each mold;
   second cam means for opening the top portion of each mold; and
   means to assist the removal of the pie when the bottom portion of said mold is displaced from a first position to a second position.

3. The apparatus according to claim 2 wherein said trimming assembly includes a spring load X-shaped trimmer.

4. The apparatus according to claim 3 wherein said means to assist the removal of the pie from said molds includes a directed air stream.

5. The apparatus according to claim 4 wherein the top portion of each said mold has knife edge sides to facilitate cutting of said dough by a cutting roller positioned forward of said first cam means.

6. The apparatus according to claim 5 including third cam means to assist in the gradual opening of said top mold portion.

7. The apparatus according to claim 6 including pie catching means positioned to catch the pie removed from said mold, and means for centering said pie during subsequent conveyance.

8. The apparatus according to claim 7 including means to catch the trimmed excess dough and return said trimmed dough directly to said means providing the continuous strip of dough.

9. The apparatus according to claim 8 wherein said plurality of molds are attached to and driven along by a continuous chain link mounted on sprocket wheels rotatably mounted in the frame of the apparatus.

10. Automatic pie apparatus to produce fruit filled pie products suitable for frying comprising:
    means to produce a continuous strip of dough;
    a plurality of molds, each having displaceable top and bottom parts, moved in a continuous loop and positioned to receive said dough and to enable depositing of a filling;
    first cam means to cause one part of each of said molds to close and form the filled pie products;
    means to exert pressure on said closed molds and to trim the excess dough from the edges of said molds;
    second cam means to open said one part of each of said plurality of molds, and third cam means cooperatively positioned to insure gradual return of said one part to its open position;
    means to permit displacement of another part of each of said molds to enable removal of said pie products; and
    means positioned to assist the removal of the pie products from the molds.

11. Automatic pie apparatus comprising in combination:

a plurality of pie molds, each mold comprising displaceable top and bottom portions;

first cam means for closing said top portion after a filling has been deposited to form a pie between said top and bottom portions;

pressure roller means for exerting a predetermined pressure on said closed mold;

a dough trimming assembly coupled to said pressure roller for forcing the excess dough from the edge of said molds;

second cam means for opening the top portion of said mold; and air means to assist the removal of the pie when the bottom portion of said mold drops from a first position to a second position to enable dispensing said product onto a conveying means.

* * * * *